United States Patent [19]

Chichester et al.

[11] Patent Number: 5,248,168

[45] Date of Patent: Sep. 28, 1993

[54] FLEXIBLE QUICK DISCONNECT COUPLING WITH VIBRATION ABSORBING MEMBER

[75] Inventors: Dennis B. Chichester, Jackson; Roger A. Cassell, Parma, both of Mich.

[73] Assignee: Aeroquip Corporation, Maumee, Ohio

[21] Appl. No.: 832,810

[22] Filed: Feb. 2, 1992

[51] Int. Cl.$^5$ .................... F16L 55/02; F16L 27/00
[52] U.S. Cl. .................... 285/49; 285/319; 285/232; 285/233
[58] Field of Search .................. 285/49, 232, 234, 263, 285/300, 233, 226, 319

[56]  References Cited

U.S. PATENT DOCUMENTS

| | | |
|---|---|---|
| 2,010,546 | 8/1935 | Kenney . |
| 2,164,471 | 7/1939 | Parker ................. 285/234 |
| 2,273,395 | 2/1942 | Couty . |
| 2,538,683 | 1/1951 | Guiler et al. . |
| 2,657,076 | 10/1953 | Hubbell . |
| 2,836,436 | 5/1958 | Bianchi . |
| 3,038,553 | 6/1962 | Peters . |
| 3,190,680 | 6/1965 | Maly ..................... 285/49 |
| 3,528,260 | 9/1970 | Binder . |
| 3,576,335 | 4/1971 | Kowal ................. 285/233 |
| 3,734,546 | 5/1973 | Herbert et al. ........... 285/49 |
| 3,788,394 | 1/1974 | Derragon, Jr. . |
| 3,826,523 | 7/1974 | Eschbaugh . |
| 3,847,421 | 11/1974 | Eschbaugh et al. . |
| 3,853,337 | 12/1974 | Herbert et al. ........... 285/49 |
| 4,121,861 | 10/1978 | Gorndt ................. 285/263 |
| 4,183,556 | 1/1980 | Schwemmer ............. 285/263 |
| 4,198,078 | 4/1980 | Herbert . |
| 4,236,737 | 12/1980 | Herbert et al. ........... 285/234 |
| 4,408,467 | 10/1983 | Murnane et al. . |
| 4,480,857 | 11/1984 | Graves . |
| 4,541,658 | 9/1985 | Bartholomew . |
| 4,637,640 | 1/1987 | Fournier et al. . |
| 4,647,082 | 3/1987 | Fournier et al. . |
| 4,749,214 | 1/1988 | Hoskins et al. . |
| 4,793,150 | 12/1988 | Wattley et al. . |
| 4,793,637 | 12/1988 | Laipply . |
| 4,906,027 | 3/1990 | DeGruijter . |
| 5,048,873 | 9/1991 | Allread et al. . |
| 5,141,259 | 8/1992 | Highlen et al. ........... 285/49 |

Primary Examiner—Eric K. Nicholson
Attorney, Agent, or Firm—Emch, Schaffer, Schaub & Porcello Co.

[57] ABSTRACT

A vibration absorbing, noise attenuating connector utilizing threadless coupling connecting means including a quick disconnect feature for use in hydraulic, pneumatic and refrigeration conduit systems.

16 Claims, 4 Drawing Sheets

FLEXIBLE QUICK DISCONNECT COUPLING WITH VIBRATION ABSORBING MEMBER

TECHNICAL FIELD

The present invention relates to the field of flexible connectors for fastening together lengths of tubing and, more particularly, relates to a threadless quick disconnect type connector having an integral vibration isolation feature. Under one embodiment, the connector also incorporates a muffler to attenuate noise which results from the flow of pressurized fluids through a conduit system such as hydraulic, pneumatic and refrigeration systems.

BACKGROUND ART

Fluid systems utilizing rigid lengths of tubing such as copper, steel or aluminum tubing are often subjected to mechanical vibrations which, if not absorbed or dampened, may produce undesirable noise and may cause tubing failure due to metal fatigue. A number of prior art devices have been conceived to absorb vibrations, including torsional and bending vibrations without fluid leakage. One such device is a pressurized vibration isolator disclosed and claimed in U.S. Pat. No. 4,198,078, incorporated herein by reference, which is assigned to the assignee of the present application. As will be appreciated, the pressurized vibration isolator disclosed in U.S. Pat. No. 4,198,078 is required to be permanently assembled within the fluid transport system as by soldering or other attaching means.

The present invention provides a connector which combines the advantages of dampening vibrations and combines therein a finger latch connector or other threadless connector mechanisms which may be rapidly and easily assembled into a conduit system having rigid lengths of tubing. Such finger latch connectors have previously been known in the prior art. For example, U.S. Pat. Nos. 4,637,640 and 4,647,082, incorporated herein by reference, disclose two types of finger latch connectors. Such connectors may either provide a permanent connection or may, if desired, incorporate a releasable feature permitting disconnection of the male and female members.

The present invention provides a flexible finger latch connector incorporating therewith (1) vibration dampening, (2) rapid connect and disconnect and (3) a noise attenuating muffler. The present invention may, depending upon the requirements for the specific end use, incorporate all of such functions or any combination of such functions and does so with the advantages of enhancing the simplification of the overall system through the use of fewer components, lighter weight, less space consumption and at a lower overall cost. Equally important, the use of the flexible connector of the present invention as part of a fluid transport system results in a system which meets demanding performance requirements of such system including the requirements of vibration attenuation, noise attenuation and resistance to leakage.

It is an object of the present invention to provide a quick disconnect finger latch connector which absorbs the vibrations resulting from the flow of fluid through the system or the movement of the engine or compressor or other elements in the system. The damping of vibrations is particularly desirable in an automotive air-conditioning system.

It is a further object of the present invention to provide a quick disconnect finger latch connector having the capability to not only dampen vibrations but also to attenuate undesirable noise in a fluid system.

It is a further object of the present invention to provide a vibration dampening connector having superior sealing characteristics with the sealing structure capable of being quickly assembled and/or disassembled within its associated system and positively maintained in position.

Other objects and advantages of the present invention will become readily apparent from the attached drawings and the following description.

BEST MODE OF CARRYING OUT INVENTION

The connector of the present invention includes a male component 10 having a tubular wall 11 defining a passageway P extending along axis A. The male component 10 is an integral part of the tubing forming a component of a fluid transport system and terminates in an open end 13 and has an enlarged annular shoulder 14 spaced from such open end 13.

Figure 1:
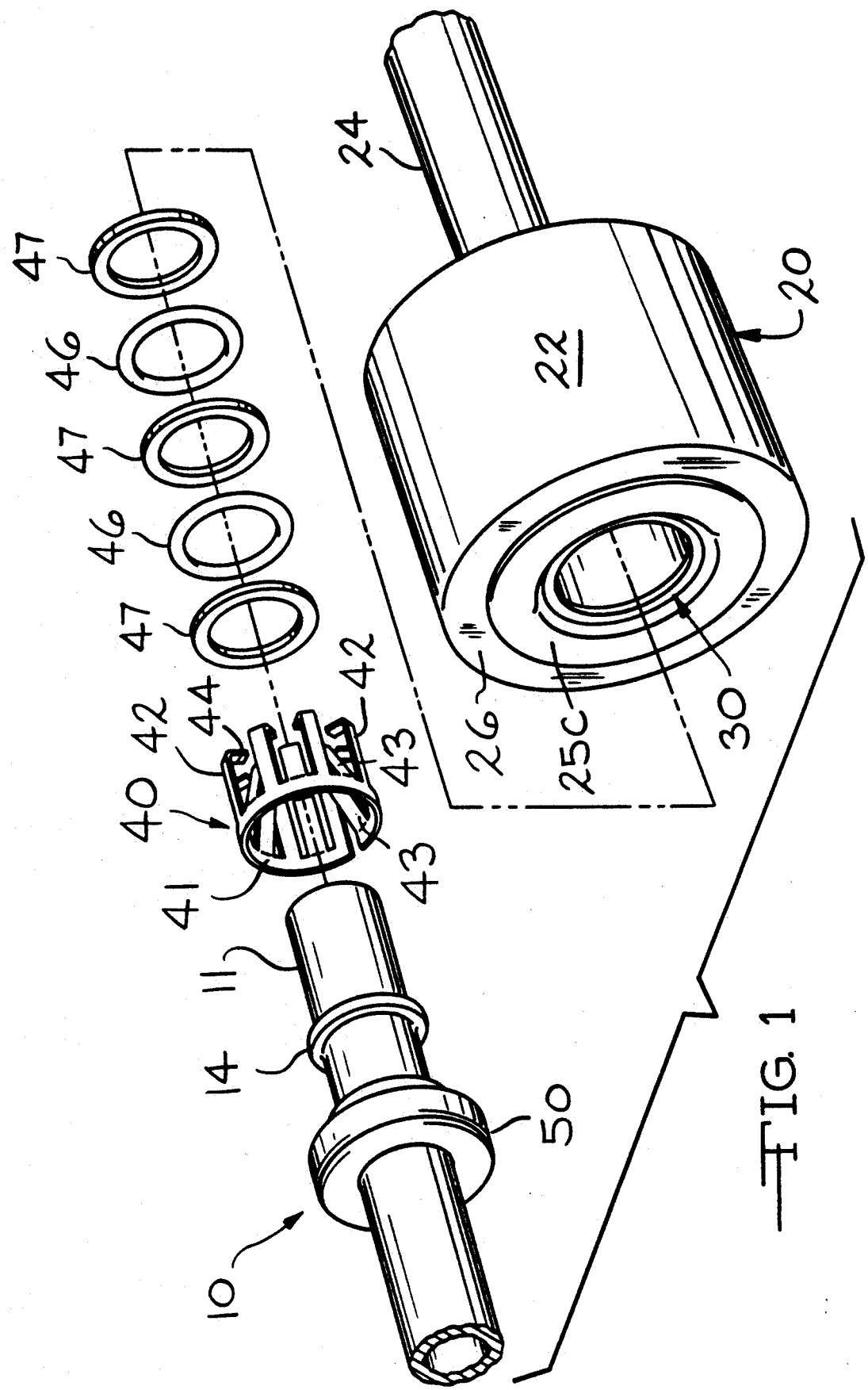
FIG. 1 is an exploded isometric view of a connector embodying the present invention.
Figure 2:
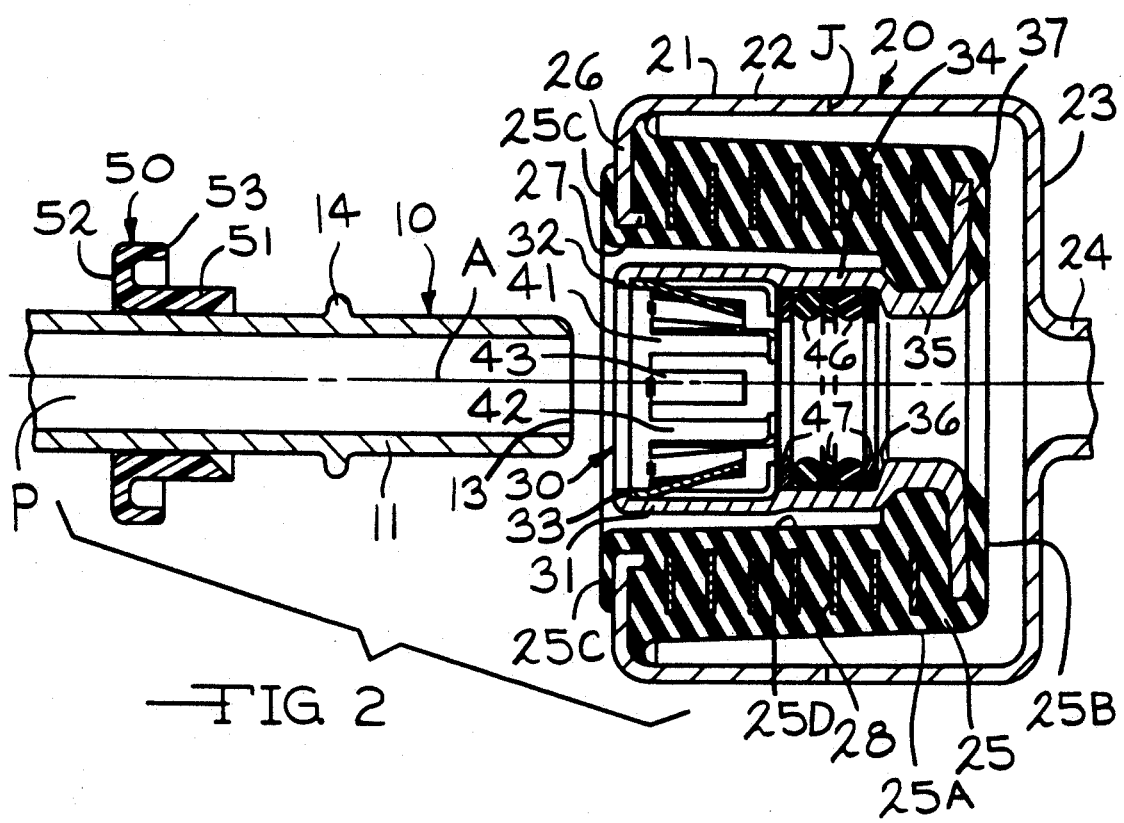
FIG. 2 is a sectional view taken through the longitudinal axis of a connector embodying the present invention showing the male portion separated from the female coupling portion.

The connector also includes a female coupling 20 comprising a hollow, thin-walled casing 21 having a cylindrical wall 22 and an integral transverse wall 23 from which extends a tubular segment 24 which is part of the fluid transport system. As shown in FIG. 2, the tubular segment 24 and the cylindrical wall 22 circumscribe axis A of the male component 10 about to be joined therewith. At the end of casing 21 and opposite transverse wall 23 is an integral radial flange 26 extending from the cylindrical wall 22 inwardly toward the axis A from which a longitudinal flange 27 extends toward the transverse wall 23 in a direction substantially parallel to the axis A. The casing 21 is formed in two pieces which may be joined together at joint J by spin welding or other suitable fastening means. If desired, the two pieces could be threadedly joined together or the casing 21 could be formed in one piece. Positioned within the casing 21 is a vibration absorbing member 25 which is formed of a suitable elastomeric material preferably a rubber-like material such as HNBR or SBR synthetic rubber, natural rubber, neoprene or a urethane material. One such material is an HNBR material marketed under the trademark TORNAC ® by Polysar Company, Sarnia, Ontario, Canada.

The vibration absorbing member 25 is permanently supported within the casing 21 by being bonded to the radial flange 26 and longitudinal flange 27 of the casing 21.

If desired, the vibration absorbing member 25 may be formed with a plurality of annular metal rings 28 imbedded within the elastomer material to provide additional resistance to angular displacement as set forth in U.S. Pat. No. 4,198,078. Other means may incorporated to provide additional performance attributes to the elastomeric vibration absorbing member 25.

Figure 3:
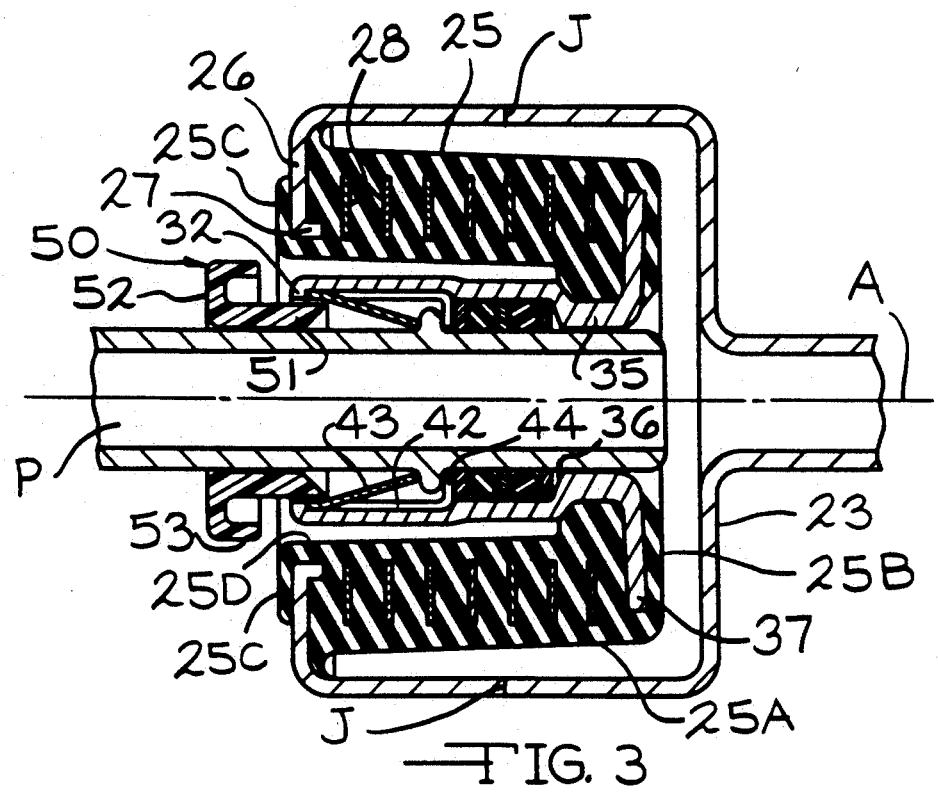
FIG. 3 is a view similar to FIG. 4 showing the members assembled together in sealing relationship.
Figure 4:
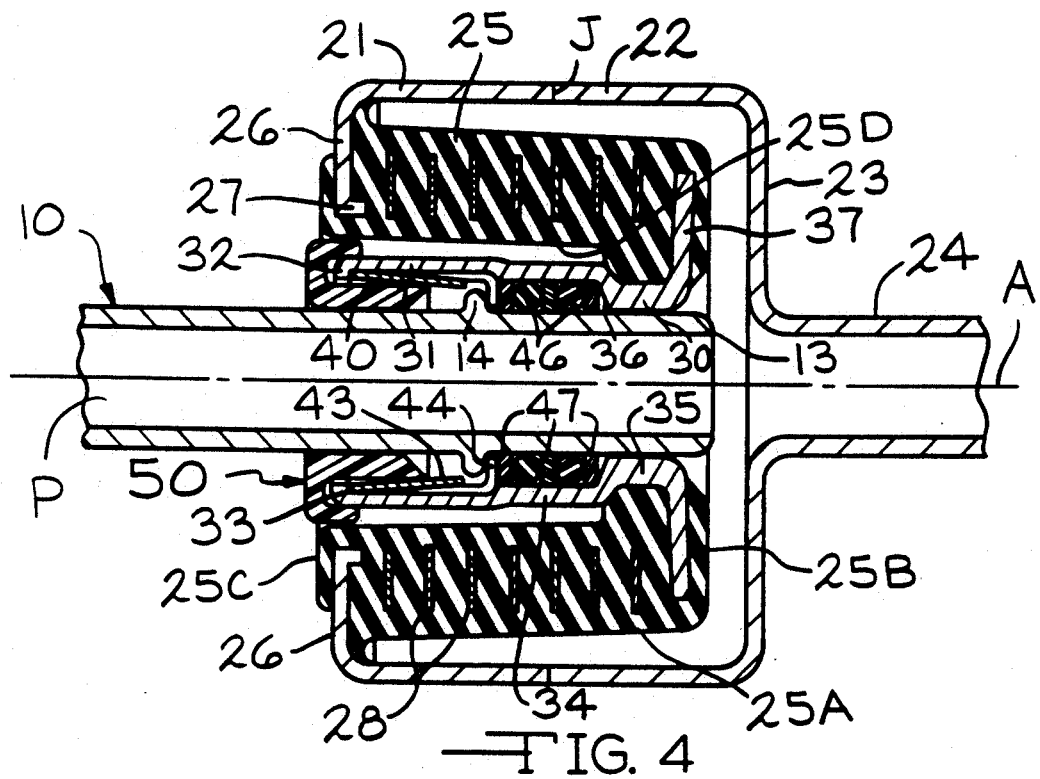
FIG. 4 is a view similar to FIG. 3 showing the finger latch release sleeve engaging and releasing the latching fingers holding the male body within the female coupling.

As may be seen from FIGS. 2–4, the vibration absorbing member 25 includes an outer wall 25A which is spaced from the interior surface of the cylindrical wall 22 of casing 21 except for the portion immediately adjacent to radial flange 26. The vibration absorbing member 25 also has a first end portion 25B spaced from the inner surface of transverse wall 23, a second end portion 25C and an inner wall 25D.

Supported within and permanently bonded to the vibration absorbing member 25 is the body portion 30 of a finger latch connector. The other elements of the finger latch connector include a finger clip 40, O-ring seals 46 and circumferential spacers 47.

The body portion 30 includes a first cylindrical wall portion 31 spaced from the inner wall 25D of the vibration absorbing member 25. A short radial flange 32 extends inwardly from the first cylindrical wall portion 31 and defines an opening into which the tubular wall 11 of the male component 10 may be inserted. The interior surface of the first cylindrical wall portion 31 cooperates with the interior surface of the inwardly directed flange 32 to form a shoulder 33. Extending from the first cylindrical wall portion 31 is a second cylindrical wall portion 34 having a reduced diameter from that of the first cylindrical wall portion 31. A third cylindrical wall portion 35 having a smaller diameter than the second cylindrical wall portion 34 is joined to such second cylindrical wall portion at an inwardly directed shoulder 36. Extending radially outward from the third cylindrical wall portion 35 is a flange 37 embedded in and permanently bonded to the vibration absorbing member 25 in an area adjacent the end 25B. The portions of the vibration absorbing member 25 encircling the third cylindrical wall portion 35 abut and are bonded to the outer surface of the third cylindrical wall portion 35.

The vibration absorbing member 25 is molded in place prior to joining together the two sections of casing 21. Thus, prior to joining the transverse wall 23 portion of the casing 21 to the other portion, mold sections (not shown) including a first mold section having molding surfaces conforming to the desired configurations of the outer wall 25A and first end portion 25B and a second mold section having molding surfaces conforming to the desired configurations of the second end portion 25C and inner wall 25D are positioned with the flange 37 and third cylindrical wall portion 35 of the body portion of the retainer enclosed therein and with the radial flange 26 and longitudinal flange 27 of the casing 21 and metal rings 28 enclosed therein. The elastomeric material is then molded around and permanently bonded to such flanges 26, 27 and 37 with the metal rings 28 encapsulated therein to form the vibration absorbing member 25. As will be appreciated, the outer surface of the third cylindrical wall portion 35 adjacent the flange 37 and the interior surface of cylindrical wall 22 adjacent the flange 26 will have the plasticized material bonded thereto during the injection molding process.

Positioned within the body portion 30 of the retainer is a metallic finger clip 40 formed of spring steel having a split collar 41 and two sets of fingers 42 and 43 extending therefrom. The first set of fingers 42 are generally parallel to one another and, when positioned within the body portion 30, are snugly engaged to the interior surface of the first cylindrical portion 31. Each of such first set of fingers 42 terminates in an inwardly directed flange 44 which, upon assembly, preferably abuts the shoulder between the first cylindrical portion 31 and the second cylindrical portion 34 when the end of the collar 41 is abutting at the shoulder 33.

The second set of fingers 43 are angularly directed inwardly toward the axis A and are positioned such that each pair of first fingers 42 has a second finger 43 positioned therebetween and each set of second fingers 43 has a first finger 42 positioned therebetween so that there are alternating first fingers 42 and second fingers 43. The second set of fingers 43 is shorter than the first set of fingers 42 by an amount substantially equal to the longitudinal extent of the annular shoulder 14 of the male component 10 so that when the male component 10 is in the retained position as shown in FIG. 3, the leading side of such annular shoulder 14 will engage the flanges 44 of the first set of fingers and the trailing side of such annular shoulder 14 will be engaged by the ends of the second set of fingers 43.

Positioned within the second cylindrical portion 34 are a pair of O-ring seals 46 and three circumferential plastic or metal spacers 47 with the O-ring seals 46 each having a spacer 47 positioned on opposite sides thereof. The O-ring seals may be formed of a resilient, chemically stable polymeric material such as a fluorosilicone polymer known as Neoprene W. The assembly of O-ring seals 46 and spacers 47 is fixed within the second cylindrical portion 34 by the shoulder 36 at one end and by the flanges 44 extending inwardly from the first set of fingers 42 of clip 40. As will be appreciated, the split collar 41 of the clip 40 may be pinched together to permit its insertion in the body portion 30 and will, upon release following insertion, spring outwardly to radially expand against the interior wall of the first cylindrical portion 31 to be retained at the shoulder 33 at one end with the flange 44 of the first set of fingers 42 engaging the closest spacer 47 at the other end.

When it is desired to assemble the male component 10 to the female coupling 20, the tubing portion 11 adjacent the open end 13 is simply inserted into the opening defined by the flange 32, the clip 40, the assembly of O-ring seals 46 and circumferential spacers 47 and the third cylindrical wall 35 of the body portion 30. During such movement the enlarged annular shoulder 14 biases the inwardly tapering second set of fingers 43 outwardly as it slides therealong. Upon reaching the end of the fingers 43 upon full insertion, the fingers 43 are then permitted to spring inwardly to engaged the trailing side of the annular shoulder 14, thus, retaining the male component 10 in a locked position in the female coupling with the annular shoulder 14 pinned between the flanges 44 of the first set of fingers 42 and the ends of the second set of fingers 43.

Although one type of clip 40 has been disclosed, it will be appreciated that any one of a wide variety of clips could be used as part of the finger latch connector feature of the present invention including at least some of those disclosed in the following U.S. Pat. Nos. 4,637,640; 4,647,082 and 4,793,637.

The outer surface of the tubing portion 11 in the area between the open end 13 and enlarged annular shoulder 14 has a diameter slightly larger than the inside diameter of the O-ring seals 46 so that when inserted in the position shown in FIG. 3 there will be formed a seal between the annular O-ring seals 46 and the outer surface of the adjacent portion of the tubing portion 11 which is highly resistant to leakage.

As will be appreciated, the space between the outer surface of the vibration absorbing member 25 and the cylindrical wall 22 and transverse wall 23 permits the vibration absorbing member 25 to move and become angularly displaced with respect to the axis A.

The presence of the space between the outer surface of the first and second cylindrical portions 31, 34 of the body portion 30 and the interior surface 25D of the vibration absorbing member 25 enhances the ability of the vibration absorbing member 25 to be angularly displaced upon being subjected to vibration or other system motion. Additionally, removal of the stiffening members 28 will permit greater amount of angularly displacement.

If desired, the connector may be provided with means for disconnecting the male component 10 from the female coupling 20. Thus, there may be provided a sleeve 50 snugly engaging the exterior surface of the tubing portion 11 on the opposite side of the enlarged annular shoulder 14 from the open end 13. The sleeve may include a cylindrical portion 51, outwardly extending shoulder 52 and a downwardly extending segment 53. As can be seen in comparing FIGS. 3 and 4, when it is desired to remove the male component 10 from the female coupling 20, the sleeve 50 is simply moved toward the annular shoulder 14. This results in the cylindrical wall 51 biasing the inwardly tapering second set of fingers 43 outwardly to a position beyond the outer extent of the annular bead 14, thus permitting the male component 10 to be removed from the female coupling.

Figure 5:
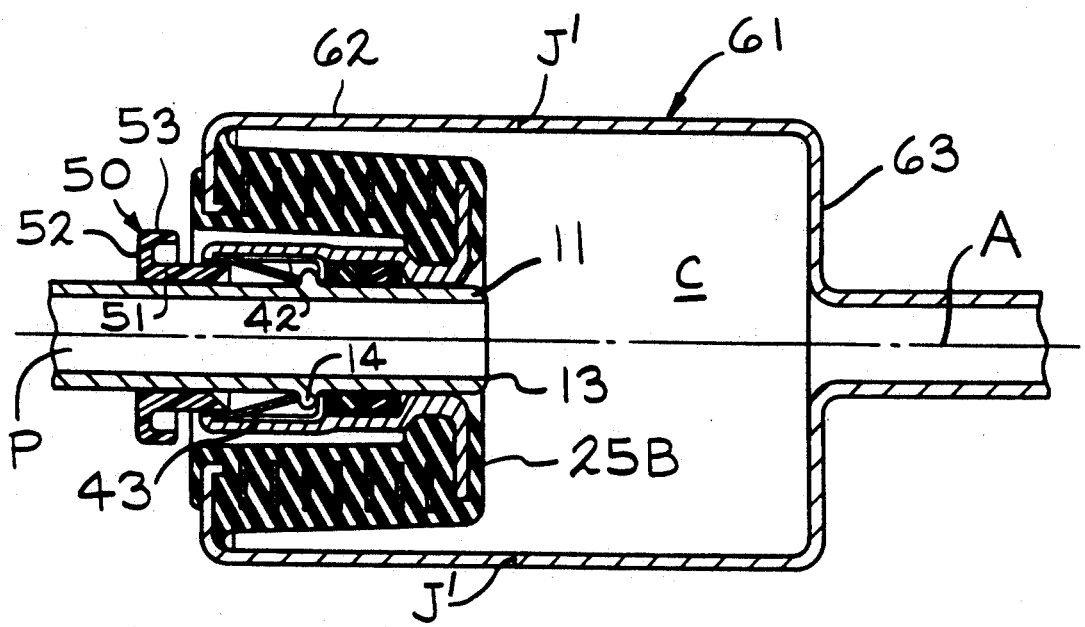
FIG. 5 is a sectional view of a modified embodiment of the present invention incorporating a muffler.

Referring now to FIG. 5, there is shown a modified embodiment incorporating a muffler feature with the finger latch quick disconnect coupling. Under this embodiment, there is provided a housing/muffler 61 having a cylindrical side wall 62 having an axial length significantly longer than the length of the cylindrical wall 22 of casing 21 of the embodiment of FIGS. 2-4. All other members of the embodiment of FIG. 5 are identical to those shown and described in FIGS. 2-4. The housing/muffler includes a transverse wall 63 which is spaced from the end 25B of the vibration absorbing member 25 a distance significantly greater than the distance from the end 25B to the transverse wall 23 of the embodiment of FIGS. 2-4. As a result, an enlarged chamber C is formed within the housing/muffler 61 in the area between the end 25B of the vibration absorbing member and the transverse wall 62. The chamber C serves to absorb and reduce noise which occurs in the system.

The length of the cylindrical side wall 62 and, therefore, the distance between the end 25B of vibration absorbing member 25 and the transverse wall 63 which determines the size of the chamber C will depend upon the type of overall fluid transport system and the application of its use and primarily the amount of deleterious harmonics developed in the system. The greater the amount of deleterious harmonics developed in such fluid transport system, the larger size chamber C required to absorb and muffle the sound developed by such harmonics. The size of the chamber C may be increased by increasing the length or the diameter of the cylindrical wall 62 or both.

As in the embodiment of FIGS. 2-4, the cylindrical wall 62 is formed in two sections which are joined together at joint J' following forming of the vibration absorbing member around the flanges 26, 27 and 37 as previously described.

Other types of threadless connector mechanisms may be used in the connector of the present invention.

Figure 6:
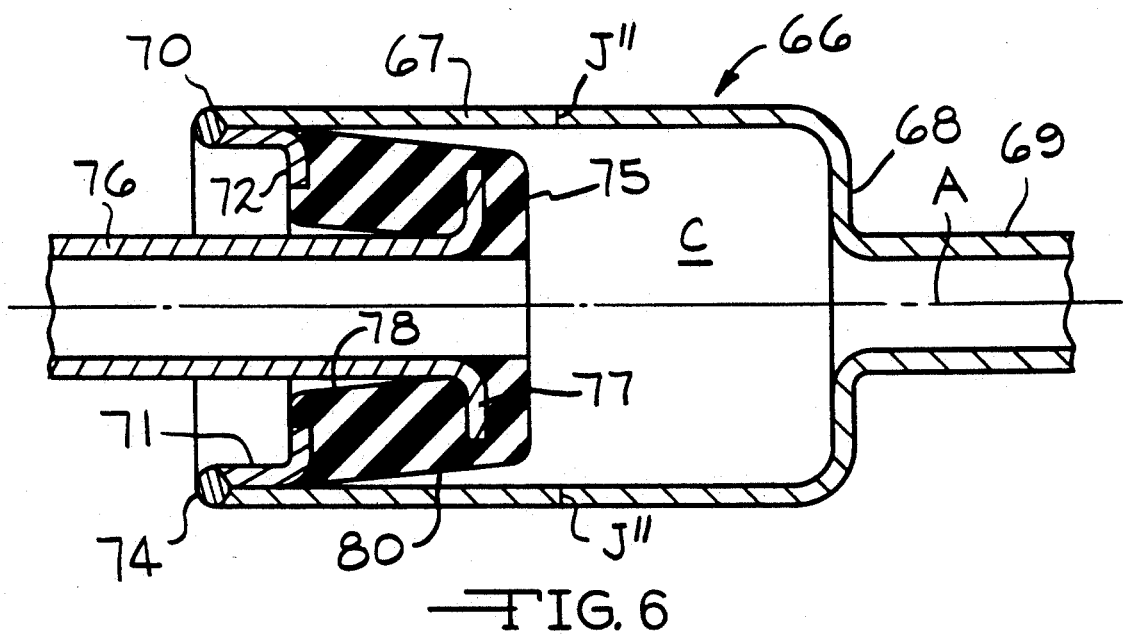
FIG. 6 is a sectional view showing a further modified embodiment combining a vibration absorber feature with a muffler in a connector intended to be permanently assembled in a tubular transport system.

Referring now to FIG. 6, there is shown an additional embodiment which utilzes a vibration absorbing member in combination with a muffler feature as part of a permanently joined unit without a quick disconnect feature as utilized in the embodiments of FIGS. 1-5. Under the embodiment of FIG. 6, there is provided a housing/muffler 66 having a cylindrical wall portion 67 and a transverse wall portion 68 at one end from which extends a length of tubing 69. The cylindrical wall 67 terminates at an open end 70 and has positioned therein a reaction wall 71 which is permanently affixed therein by a continuous weld bead 74. The reaction wall 71 has an inwardly extending flange 72. In lieu of welding a separate member, the reaction wall 71 could be formed by reshaping the end of the cylindrical wall 67.

Prior to positioning the reaction wall 73 therein, an elastomeric vibration absorbing member 75 mounted on the end of a tubular segment or piston stem 76 is positioned therein. The piston stem 76 has a radially outwardly extending flange 77 to which the vibration absorbing member 75 is bonded. As may be seen in FIG. 6, the vibration absorbing member 75 has an outer wall 80 which tapers inwardly toward the axis A as it extends away from the flange 72 thereby providing a space between the vibration absorbing member 75 and the inner surface of the cylindrical wall 67 throughout a major portion thereof thus permitting bending and movement of the piston stem to an angle relative to the axis A. The reaction wall 71 inwardly directed flange 72 engages and is bonded to the end of the vibration absorbing member 75 opposite the end bonded to the flange 77 of piston stem 76 to retain the vibration absorbing member 75 in position.

The vibration absorbing member 75 has an interior wall portion 78 tapering at an angle away from the axis A to the end engaged by the inwardly directed flange 72 of the reaction wall 71. This provides a gap to more readily accommodate the motion of the piston stem 76. If desired, the housing/muffler 66 could be formed in two sections with the cylindrical wall portion 67 joined together at a joint J''. In that way, the vibration absorbing member can be formed in place by injection molding.

Pressurized fluid moving through the piston stem 76 to the tubing 69 or from the tubing 69 to the piston stem 76 will pass through the chamber C between the end of the vibration absorbing member 75 and the transverse wall 62 and will thus absorb and reduce the noise.

As shown, the vibration absorbing member 75 is formed solely of an elastomer bonded to the end of the piston stem. However, if desired a stiffening ring or other member as disclosed in U.S. Pat. No. 4,637,640 could be provided.

The connector of the present invention provides one which may be readily assembled and, if desired, disassembled and combines therewith a vibration absorbing feature and in other embodiments a muffler feature.

Many modifications will become readily apparent to those skilled in the art. Accordingly, the scope of the present invention should be limited only by the scope of the appended claims.

We claim:

1. A connector comprising:
   (a) a tubular member having a wall extending along an axis to an open end, said wall having a cylindrical outer surface portion and engagement means; and,
   (b) a coupling member having
      (i) a casing with an annular side wall and spaced apart first and second ends, each of said ends having an opening lying along an axis;
      (ii) a vibration absorbing member within said casing, said vibration absorbing member including a supported end adjacent said casing first end, a free end, an external wall portion between said supported end and said free end, and an inner wall defining an axial passageway generally aligned with said axis;
      (iii) means extending from said casing first end for supporting said vibration absorbing member within said casing with said external wall portion and said free end in spaced relationship with said casing second end and annular side wall and cooperating with said casing to define a gap, said means permitting angular displacement of said vibration absorbing member within said gap; and
      (iv) retention means on said vibration absorbing member for rapidly engaging and disengaging said tubular member within said central passageway in sealing relationship.

2. A connector according to claim 1, wherein said casing has a chamber extending beyond said vibration absorbing member free end for muffling noise of a fluid passing therethrough.

3. A connector according to claim 2, wherein said vibration absorbing member inner wall is in spaced relationship with all other components of said connector at said supported end and throughout a major portion of its axial length from said supported end to said free end.

4. A connector according to claim 1, wherein said retention means includes:
   (a) an annular body member positioned within said axial passageway and sized to receive said tubular member, said body member being mounted on said vibration absorbing member adjacent said free end;
   (b) annular gasket means retained with said body member for receiving said tubular member in sealing relationship with said outer surface portion; and
   (c) radially displaceable latch means cooperating with said body member for receiving said tubular member and engaging said engagement means.

5. A connector according to claim 4, wherein said vibration absorbing member inner wall is in spaced relationship with all other components of said connector at said supported end and throughout a major portion of its axial length from said supported end to said free end.

6. A connector comprising:
   (a) a tubular member having a wall extending along an axis to an open end, said wall having a cylindrical outer surface portion and engagement means; and,
   (b) a coupling member having
      (i) a casing with an annular side wall and spaced apart first and second ends, each of said ends having an opening lying along an axis;
      (ii) a vibration absorbing member within said casing extending from a supported end adjacent said casing first end to a free end spaced from said casing second end, said vibration absorbing member having an inner wall defining an axial passageway generally aligned with said axis and an annular outer wall;
      (iii) means extending from said casing first end for supporting said vibration absorbing member within said casing in spaced relationship with said casing second end and annular side wall, said means permitting angular displacement of said vibration absorbing member adjacent said free end; and
      (iv) retention means on said vibration absorbing member for retaining said tubular member within said central passageway in sealing relationship, said retention means including
         (A) an annular body member positioned within said axial passageway and sized to receive said tubular member, said body member being mounted on said vibration absorbing member adjacent said free end;
         (B) annular gasket means retained with said body member for receiving said tubular member in sealing relationship with said outer surface portion; and
         (C) latch means cooperating with said body member for receiving said tubular member and engaging said engagement means;
   said body member including a first cylindrical wall portion having a predetermined diameter encircling said latch means and terminating at an inwardly directed shoulder, a second cylindrical wall portion having a diameter smaller than said predetermined diameter extending from said shoulder and encircling said annular gasket means, a second shoulder extending inwardly from said second cylindrical wall portion, said gasket means being retained between said latch means and said second shoulder.

7. A connector according to claim 6, wherein said body member has an inwardly directed flange extending from said first cylindrical wall portion and said latch means includes a collar engaging said inwardly directed flange, a first set of spaced apart fingers abutting said second cylindrical wall portion and extending from said collar to an end at said inwardly directed shoulder and a second set of spaced apart fingers extending from said collar and angled inwardly toward said axis and terminating at free ends axially spaced from the ends of said first set of spaced apart fingers, said second set of spaced apart fingers being capable of being resiliently urged outwardly upon movement of said tubular member engagement means thereby, said second set of spaced apart fingers moving inwardly to engage said engagement means following movement of said tubular member engagement means to a position beyond the ends of said second set of fingers.

8. A connector according to claim 6, wherein said body member first cylindrical wall portion is in spaced relationship with said vibration absorbing member.

9. A connector according to claim 6, wherein said casing has a chamber extending beyond said vibration absorbing member free end for muffling noise of a fluid passing therethrough.

10. A connector according to claim 7 further including means for disconnecting said tubular member from said coupling member comprising a sleeve encircling said tubular member outer surface in an area on the opposite side of said engagement means from said open end, said sleeve being axially slideable along said tubular member outer surface from a first position remote from said engagement means to a second position in the vicinity of said engagement means, said sleeve contacting and urging said second set of spaced apart fingers outwardly to disengage them from said engagement means as said sleeve is moved to said second position.

11. A connector comprising:
 (a) a tubular member having a wall extending along an axis to an open end, said wall having a cylindrical outer surface portion and engagement means; and,
 (b) a coupling member having
  (i) a casing with an annular side wall and spaced apart first and second ends, each of said ends having an opening lying along an axis;
  (ii) a vibration absorbing member within said casing extending from a supported end adjacent said casing first end to a free end spaced from said casing second end, said vibration absorbing member having an inner wall defining an axial passageway generally aligned with said axis and an annular outer wall;
  (iii) means extending from said casing first end for supporting said vibration absorbing member within said casing in spaced relationship with said casing second end and annular side wall, said means permitting angular displacement of those portions of said vibration absorbing member adjacent said free end; and
  (iv) retention means on said vibration absorbing member for receiving and retaining said tubular member within said central passageway in sealing relationship, said retention means including
   (A) an annular body member positioned within said axial passageway and sized to receive said tubular member, said body member being mounted on said vibration absorbing member adjacent said free end;
   (B) annular gasket means retained with said body member for receiving said tubular member in sealing relationship with said outer surface portion; and
   (C) latch means retained within said body member for receiving said tubular member and having radially displaceable members releasably engaging said engagement means.

12. A connector according to claim 11, wherein said vibration absorbing member inner wall is in spaced relationship with all other components of said connector at said supported end and throughout a major portion of its axial length from said supported end to said free end.

13. A connector comprising:
 (a) a tubular member having a wall extending along an axis to an open end, said wall having a cylindrical outer surface portion and engagement means; and,
 (b) a coupling member having
  (i) a casing with an annular side wall and spaced apart first and second ends, each of said ends having an opening lying along as axis;
  (ii) a vibration absorbing member within said casing extending from a supported end adjacent said casing first end to a free end spaced from said casing second end, said vibration absorbing member having an inner wall defining an axial passageway generally aligned with said axis and an annular outer wall;
  (iii) means extending from said casing first end for supporting said vibration absorbing member within said casing in spaced relationship with said casing second end and annular side wall, said means permitting angular displacement of those portions of said vibration absorbing member adjacent said free end; and
  (iv) retention means on said vibration absorbing member for receiving and retaining said tubular member within said central passageway in sealing relationship, said retention means including
   (A) an annular body member positioned within said axial passageway and sized to receive said tubular member, said body member being mounted on said vibration absorbing member adjacent said free end;
   (B) annular gasket means retained with said body member for receiving said tubular member in sealing relationship with said outer surface portion; and
   (C) latch means retained within said body member for receiving said tubular member and engaging said engagement means;
 said body member including a first cylindrical wall portion having a predetermined diameter encircling said latch means and terminating at an inwardly directed shoulder, a second cylindrical wall portion having a diameter smaller than said predetermined diameter extending from said shoulder and encircling said annular gasket means, a second shoulder extending inwardly from said second cylindrical wall portion, said gasket means being retained between said latch means and said second shoulder.

14. A connector according to claim 13, wherein said body member has an inwardly directed flange extending from said first cylindrical wall portion and said latch means includes a collar engaging said inwardly directed flange, a first set of spaced apart fingers abutting said second cylindrical wall portion and extending from said collar to an end at said inwardly directed shoulder and a second set of spaced apart fingers extending from said collar and angled inwardly toward said axis and terminating at free ends axially spaced from the ends of said first set of spaced apart fingers, said second set of spaced apart fingers being capable of being resiliently urged outwardly upon movement of said tubular member engagement means thereby, said second set of spaced apart fingers moving inwardly to engage said engagement means following movement of said tubular member engagement means to a position beyond the ends of said second set of fingers.

15. A connector according to claim 14 further including means for disconnecting said tubular member from said coupling member comprising a sleeve encircling said tubular member outer surface in an area on the opposite side of said engagement means from said open end, said sleeve being axially slideable along said tubular member outer surface from a first position remote from said engagement means to a second position in the vicinity of said engagement means, said sleeve contacting and urging said second set of spaced apart fingers outwardly to disengage them from said engagement means as said sleeve is moved to said second position.

16. A connector according to claim 11, wherein said casing has a chamber extending beyond said vibration absorbing member free end for muffling noise of a fluid passing therethrough.

* * * * *